(12) United States Patent
Buckley et al.

(10) Patent No.: US 11,943,262 B2
(45) Date of Patent: *Mar. 26, 2024

(54) SECURING METHOD FOR LAWFUL INTERCEPTION

(71) Applicant: Malikie Innovations Limited, Dublin (IE)

(72) Inventors: Michael Eoin Buckley, Grayslake, IL (US); Michael Charles Hollatz, Huntley, IL (US); Robert John Lambert, Cambridge (CA); Nevine Maurice Nassif Ebeid, Kitchener (CA)

(73) Assignee: MALIKIE INNOVATIONS LIMITED, Dublin (IE)

( * ) Notice: Subject to any disclaimer, the term of this patent is extended or adjusted under 35 U.S.C. 154(b) by 341 days.

This patent is subject to a terminal disclaimer.

(21) Appl. No.: 17/322,424

(22) Filed: May 17, 2021

(65) Prior Publication Data
US 2021/0329039 A1    Oct. 21, 2021

Related U.S. Application Data

(63) Continuation of application No. 16/420,867, filed on May 23, 2019, now Pat. No. 11,032,324, which is a
(Continued)

(51) Int. Cl.
*H04L 29/06* (2006.01)
*H04L 9/08* (2006.01)
(Continued)

(52) U.S. Cl.
CPC .......... *H04L 63/306* (2013.01); *H04L 9/0847* (2013.01); *H04L 9/14* (2013.01);
(Continued)

(58) Field of Classification Search
CPC ....... H04L 63/306; H04L 9/0847; H04L 9/14; H04L 9/3073; H04L 9/3252;
(Continued)

(56) References Cited

U.S. PATENT DOCUMENTS 7,415,606 B2    8/2008 Tuvell et al.
9,467,283 B2    10/2016 Buckley et al.
(Continued)

FOREIGN PATENT DOCUMENTS

CN    1602611 A    3/2005
CN    1620005 A    5/2005
(Continued)

OTHER PUBLICATIONS

Canadian Office Action; Application No. 2,916,527; dated Sep. 6, 2022; 3 pages.
(Continued)

*Primary Examiner* — Tu T Nguyen
(74) *Attorney, Agent, or Firm* — Conley Rose, P.C.; J. Robert Brown, Jr.

(57) ABSTRACT

A method is presented for secure communication, the method including generating a signature using a private key, a nonce, and at least one of an identifier and a key component; and transmitting the signature, the nonce, a security parameter, and the at least one of the identifier and the key component, wherein the security parameter associates a user identity with a public key, the public key being associated with the private key.

20 Claims, 8 Drawing Sheets

Related U.S. Application Data continuation of application No. 15/272,927, filed on Sep. 22, 2016, now Pat. No. 10,320,850, which is a continuation of application No. 13/925,299, filed on Jun. 24, 2013, now Pat. No. 9,467,283.

(51) Int. Cl.
| | |
|---|---|
| *H04L 9/14* | (2006.01) |
| *H04L 9/30* | (2006.01) |
| *H04L 9/32* | (2006.01) |
| *H04L 9/40* | (2022.01) |
| *H04M 3/22* | (2006.01) |
| *H04W 12/02* | (2009.01) |
| *H04W 12/041* | (2021.01) |
| *H04W 12/062* | (2021.01) |
| *H04W 12/80* | (2021.01) |
| *H04L 101/654* | (2022.01) |

(52) U.S. Cl.
CPC .......... *H04L 9/3073* (2013.01); *H04L 9/3252* (2013.01); *H04L 9/3263* (2013.01); *H04L 9/3297* (2013.01); *H04L 63/0435* (2013.01); *H04L 63/06* (2013.01); *H04L 63/0876* (2013.01); *H04M 3/2281* (2013.01); *H04W 12/02* (2013.01); *H04W 12/041* (2021.01); *H04W 12/062* (2021.01); *H04W 12/80* (2021.01); *H04L 2101/654* (2022.05); *H04L 2209/80* (2013.01)

(58) Field of Classification Search
CPC . H04L 9/3263; H04L 9/3297; H04L 63/0435; H04L 63/06; H04L 63/0876; H04L 2101/654; H04L 2209/80; H04M 3/2281; H04W 12/02; H04W 12/041; H04W 12/062; H04W 12/80
USPC .......................................................... 713/156
See application file for complete search history.

(56) References Cited

U.S. PATENT DOCUMENTS

| | | | |
|---|---|---|---|
| 10,320,850 | B2 | 6/2019 | Buckley et al. |
| 2002/0112152 | A1 | 8/2002 | VanHeyningen et al. |
| 2003/0023845 | A1 | 1/2003 | VanHeyningen |
| 2003/0026433 | A1 | 2/2003 | Matt |
| 2005/0063544 | A1 | 3/2005 | Uusitalo et al. |
| 2008/0076420 | A1 | 3/2008 | Khetawat et al. |
| 2008/0301459 | A1 | 12/2008 | Ebeid |
| 2009/0016527 | A1 | 1/2009 | Vigarie et al. |
| 2010/0205442 | A1 | 8/2010 | Han et al. |
| 2010/0250949 | A1 | 9/2010 | Torino et al. |
| 2011/0055567 | A1 | 3/2011 | Sundaram et al. |
| 2011/0131416 | A1 | 6/2011 | Schneider |
| 2012/0036567 | A1 | 2/2012 | Senese et al. |
| 2012/0198234 | A1 | 8/2012 | Chung et al. |
| 2012/0272064 | A1 | 10/2012 | Sundaram et al. |
| 2019/0312913 | A1 | 10/2019 | Buckley et al. |

FOREIGN PATENT DOCUMENTS

| | | |
|---|---|---|
| CN | 1832403 A | 9/2006 |
| CN | 1992593 A | 7/2007 |
| CN | 101719895 A | 6/2010 |
| CN | 102025507 A | 4/2011 |
| CN | 102484582 A | 5/2012 |
| CN | 102484583 A | 5/2012 |
| KR | 20050037723 A | 4/2005 |

OTHER PUBLICATIONS

Canadian Office Action; Application No. 2,916,527; dated Feb. 16, 2022; 3 pages.
Mattsson, J., et al.; Mikey-Ticket: Ticked-Based Modes of Key Distribution in Multimedia Internet KEYing (Mikey); RFC 6043; Mar. 2011; 58 pages.
Office Action dated Feb. 16, 2016; U.S. Appl. No. 13/925,299, filed Jun. 24, 2013; 12 pages.
Notice of Allowance dated Jun. 6, 2016; U.S. Appl. No. 13/925,299, filed Jun. 24, 2013; 8 pages.
Office Action dated Jul. 3, 2017; U.S. Appl. No. 15/272,927, filed Sep. 22, 2016; 6 pages.
Office Action dated Dec. 1, 2017; U.S. Appl. No. 15/272,927, filed Sep. 22, 2016; 19 pages.
Office Action dated Jun. 28, 2018; U.S. Appl. No. 15/272,927, filed Sep. 22, 2016; 16 pages.
Notice of Allowance dated Feb. 1, 2019; U.S. Appl. No. 15/272,927, filed Sep. 22, 2016; 18 pages.
Office Action dated Jun. 12, 2020; U.S. Appl. No. 16/420,867, filed May 23, 2019; 17 pages.
Notice of Allowance dated Oct. 9, 2020; U.S. Appl. No. 16/420,867, filed May 23, 2019; 11 pages.
Notice of Allowance dated Feb. 10, 2021; U.S. Appl. No. 16/420,867, filed May 23, 2019; 12 pages.
PCT International Search Report; Application No. PCT/IB2014/002161; dated Apr. 2, 2015; 3 pages.
PCT Written Opinion of the International Searching Authority; Application No. PCT/IB2014/002161; dated Apr. 2, 2015; 3 pages.
Canadian Office Action; Application No. 2,916,527; dated Jul. 8, 2020; 3 pages.
Canadian Office Action; Application No. 2,916,527; dated Apr. 23, 2021; 3 pages.
European Extended Search Report; Application No. 14826520.0; dated Jan. 30, 2017; 8 pages.
European Examination Report; Application No. 14826520.0; dated Oct. 29, 2019; 4 pages.
Chinese Office Action; Application No. 201480036064.5; dated Jan. 17, 2018; 11 pages.
Chinese Office Action; Application No. 201480036064.5; dated Aug. 3, 2018; 13 pages.
Korean Office Action; Application No. 10-2016-7001987; dated Apr. 17, 2017; 18 pages.
Chinese Office Action; Application No. 201910256449.7; dated Feb. 1, 2021; 10 pages.

SECURING METHOD FOR LAWFUL INTERCEPTION

CROSS-REFERENCE TO RELATED APPLICATIONS

This application is a continuation of U.S. patent application Ser. No. 16/420,867 filed May 23, 2019 by Michael Eoin Buckley, et al. entitled, "Securing Method for Lawful Interception", which is a continuation of U.S. patent application Ser. No. 15/272,927 filed Sep. 22, 2016 by Michael Eoin Buckley, et al. entitled, "Securing Method for Lawful Interception", which is a continuation of U.S. patent application Ser. No. 13/925,299 filed Jun. 24, 2013 by Michael Eoin Buckley, et al. entitled, "Securing Method for Lawful Interception". U.S. patent application Ser. No. 15/272,927 also claims priority to International Application No. PCT/IB2014/002161 filed Jun. 24, 2014, all of which are incorporated by reference herein as if reproduced in their entirety.

FIELD

The present disclosure is directed to a secure method of lawful interception.

BACKGROUND

The 3rd Generation Partnership Project (3GPP) is currently considering several lawful interception and key generation approaches for IP Multimedia Subsystem (IMS) media security. One such key generation approach is Multimedia Internet KEYing—Identity Based Authentication Key Exchange (MIKEY-IBAKE), which is an example of the well-known Diffie-Hellman key exchange. The goal of such a key generation protocol is to establish agreement on a session key $K_{sess}$ between two UEs, where UE stands for user equipment.

As shown in FIG. 1, the steps in the MIKEY-IBAKE process can be summarized as follows: (1) $UE_1$ generates private key information $K_1$ by using a its key generation unit (KGU); (2) $UE_1$ computes $K_1P$ using $K_1$ and a publicly known elliptic curve point P; (3) $UE_1$ transmits $K_1P$ to $UE_2$ using Session Initiation Protocol (SIP) signaling via device $CSCF_1$ and device $CSCF_2$, each of which implements a Call Session Control Function (CSCF); (4) $UE_2$ generates private key information $K_2$ by using its KGU; (5) $UE_2$ computes $K_2P$ using $K_2$ and the publicly known elliptic curve point P; (6) $UE_2$ transmits $K_2P$ to $UE_1$ using SIP signaling; and (7) $UE_1$ and $UE_2$ each generate $K_{sess}=K_1K_2P$ using $[K_1,K_2P]$ and $[K_1P, K_2]$, respectively.

In FIG. 1, the only entities with knowledge of the session key are $UE_1$ and $UE_2$. However, in addition to providing secure communications between UEs, government regulations also require that lawful interception be supported.

FIG. 2 illustrates a conventional key generation process allowing for lawful interception. As shown in FIG. 2, each KGU in a corresponding $UE_i$ produces corresponding keying information $K_i$ in a defined way from a corresponding master key $KM_i$ and a timestamp $T\alpha$. The master key $KM_i$ is known only to the corresponding $UE_i$ and a corresponding network device that is configured to perform a network intercept function under control of a corresponding law enforcement agency (LEA), as illustrated in FIG. 2. For example, $CSCF_1$ and a corresponding intercept device of $LEA_1$ are part of a first network, while $CSCF_2$ and a corresponding intercept device of $LEA_2$ are part of a second network, which is in communication with the first network.

Further, the timestamp $T\alpha$ used in generating the corresponding keying information $K_i$ is transmitted along with $K_iP$ in SIP by each corresponding $UE_i$. Both $K_iP$ and $T\alpha$ can be stored in one or more of the CSCF devices ($CSCF_1$ and $CSCF_2$) in the respective networks, as shown in FIG. 2. In particular, note that FIG. 2 shows the general case of UEs located in different networks, thus requiring separate CSCF devices. When UEs are located in a single network, only one CSCF device need be used.

The steps taken by the interception device of $LEA_2$ in generating the session key $K_{sess}$ for the purpose of lawful interception are as follows: (1) retrieve $KM_2$ (used by $UE_2$) from internal storage, and retrieve $K_1P$ and $T\alpha$ from device $CSCF_2$; (2) generate keying information $K_2=f(KM_2,T\alpha)$; and (3) generate $K_{sess}=K_1K_2P$. The interception device of $LEA_2$ can now decrypt traffic between $UE_1$ and $UE_2$ and forward it to $LEA_2$. The interception process for the interception device of $LEA_1$ is analogous, but uses $KM_1$, $T\alpha$, and $K_2P$.

Further, note that the above lawful interception process can be generalized so that $UE_1$ and $UE_2$ use different timestamps for key generation and/or signaling (e.g., $T\alpha_1$, $T\alpha_2$).

BRIEF DESCRIPTION OF THE DRAWINGS

A more complete appreciation of the embodiments described therein, and many of the attendant advantages thereof will be readily obtained as the same becomes better understood by reference to the following detailed description when considered in connection with the accompanying drawings, wherein.

DETAILED DESCRIPTION

Lawful interception for the MIKEY-IBAKE process relies on network knowledge of the timestamp $T\alpha$ used to generate keying information. However, a subversive user could change the software running on a UE to avoid lawful interception by using a timestamp in generating key information that is different from the timestamp signaled in SIP, thus generating a different key component ($K_{2\beta}P$), but transmitting a timestamp $T\alpha$ that was not used to generate the key component $K_{2\beta}P$.

Figure 3:
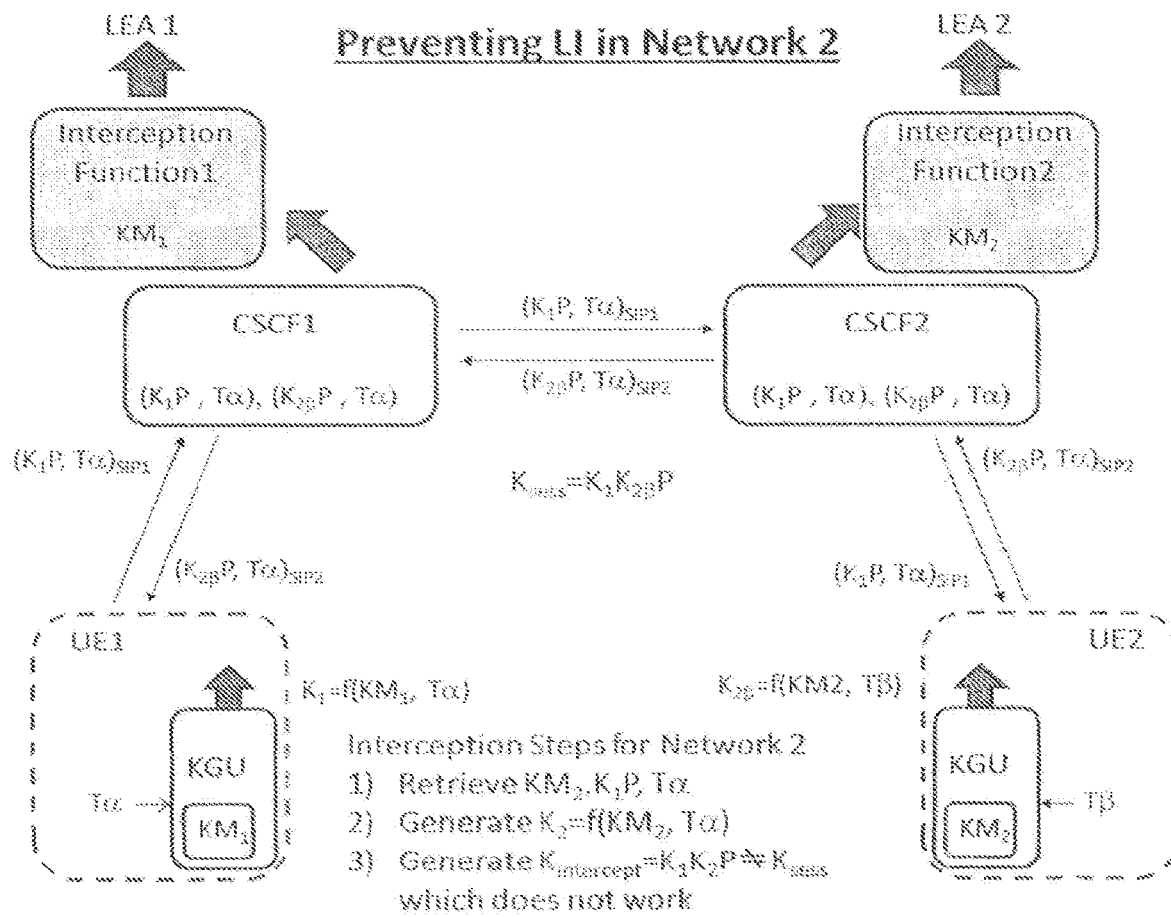
FIG. 3 illustrates a process that prevents lawful interception.

For example, as shown in FIG. 3, suppose $UE_2$'s user is malicious and wants to prevent lawful interception in his network. He thus rebuilds the kernel software that runs on his device and modifies the SIP stack such that the timestamp $T\alpha$ used for signaling on SIP is different from the timestamp $T\beta$ used for generating the keying information.

As a result, the network is unable to regenerate the necessary keying information $K_{2\beta}$ for $UE_2$, thus preventing lawful interception.

In this example, the second network stores $K_{2\beta}P$, and thus has the necessary information to determine that $UE_2$ has not used $T\alpha$ in generating $K_{2\beta}$.

If device $CSCF_2$ in the second network detects the misuse at call set-up, the network could disallow the communication. However, to be effective, the network would be required to verify $K_{2\beta}P$ in at least some percentage of call set-ups, which is highly undesirable from an operator's point of view. Operators strongly prefer any such checking, if necessary, be done at the UE.

Alternatively device $CSCF_2$ in the second network could verify $K_{2\beta}P$ as a part of the lawful interception process. However, any action such as disabling the phone or simply cutting communication, would break an existing requirement that lawful interception be undetectable by any entity except the requesting law enforcement agency and the intercepting network.

An additional consequence of this requirement is that the second network cannot work with the first network for lawful interception. For instance, in the above example, the first network has all the information necessary for lawful interception, i.e., $K_{2\beta}P$, $T\alpha$, and $KM_1$. However, because $LEA_2$ may not necessarily wish to reveal that lawful interception is occurring, any final key exchange protocol must enable the second network to carry out lawful interception without the need for contacting any additional entity.

Therefore, while the second network can detect malformed key information in the current MIKEY-IBAKE process, this process requires further modification in order to become a feasible solution meeting all current requirements.

Further, it should be noted that if both $UE_1$ and $UE_2$ have the freedom to modify their kernels, they are also free to implement any key agreement scheme, potentially even one different from a standardized key agreement scheme, but with signaling that is compliant. With the arrival of open source operating systems, such as Android, the ability to modify a kernel is, unfortunately, an accepted fact today. In fact, that ability is often touted as being desirable. Since lawful interception becomes highly improbable in such a scenario, the problem addressed herein is that of protecting against one of two UEs maliciously modifying its kernel to prevent lawful interception.

A related problem is SIP signaling of the International Mobile Station Equipment Identity (IMEI), which is an identifier of the mobile equipment (ME), i.e, of the UE not including the Subscriber Identity Module (SIM) card. The IMEI is used in some jurisdictions as the identifier under which lawful interception occurs. However, due to counterfeiting, more than one phone may share the same IMEI. While this is less of a problem in Western regions of the world, it is quite problematic in others. If multiple MEs share the same IMEI, then specifying the targeted ME becomes a more-involved process, making lawful interception more difficult. Additionally, if a UE modifies its kernel, there is a danger the UE may also signal a false IMEI, perhaps preventing lawful interception through IMEI targeting. Thus, a solution for the secure signaling of the IMEI is also needed.

In conventional systems, the subversive user will often be successful since there is insufficient security protection of the timestamp $T\alpha$ used by each KGU. What is needed is a method to guarantee that the timestamp used by the KGU is also signaled in SIP.

Accordingly, there is provided a method for secure communication, comprising: (1) generating a signature using a private key, a nonce, and at least one of an identifier and a key component; and (2) transmitting the signature, the nonce, a security parameter, and the at least one of the identifier and the key component, wherein the security parameter associates a user identity with a public key, the public key being associated with the private key. The identifier is one of an International Mobile Station Equipment Identity (IMEI), a Globally Routable User Agent URI (GRUU), an International Mobile Subscriber Identity (IMSI), and a Temporary International Mobile Subscriber Identity (TIMSI). Further, the nonce is one of a timestamp, a random number, and a sequence number and the security parameter is a certificate.

In another embodiment, there is provided a method for secure communication, the method comprising: (1) receiving a nonce, at least one of an identifier and a key component, a security parameter, and a signature that was generated using a private key, the nonce, and the at least one of the identifier and the key component; and (2) verifying the nonce and the at least one of the identifier and the key component using the received signature and the security parameter, wherein the security parameter associates a user identity with a public key, the public key being associated with the private key. When verification is successful in the verifying step, the method further includes (1) generating a session key using the at least one of the identifier and the key component; (2) generating a second signature using a second private key, a second nonce, and at least one of a second identifier and a second key component; and (3) transmitting the second signature, the second nonce, a second security parameter, and the at least one of the second identifier and the second key component, wherein the second security parameter associates a second user identity with a second public key, the second public key being associated with the second private key.

In another embodiment, there is provided a method for secure communication, the method comprising: (1) generating a MAC tag using a MAC key, a nonce, and at least one of an identifier and a key component; and (2) transmitting the MAC tag, the nonce, and the at least one of the identifier and the key component.

In another embodiment, there is provided a method for secure communication, the method comprising: (1) receiving a nonce, at least one of an identifier and a key component, and a MAC tag that was generated using the nonce, the at least one of the identifier and the key component, and a MAC key; (2) verifying the nonce and the at least one of the identifier and the key component using the received MAC tag.

In particular, in one embodiment, the KGU of a $UE_j$ signs the timestamp $T\square$ and the key component $K_jP$ using a private key $PR_j$ obtained at the time of manufacture. The public key $Pu_j$ associated with the private key $PR_j$ is certified by a certificate $C_j$, which can also be provided to the KGU at the time of manufacture. Note that while the public key is described as being separate from the certificate, in general, the public key can form part of the certificate.

Figure 4:
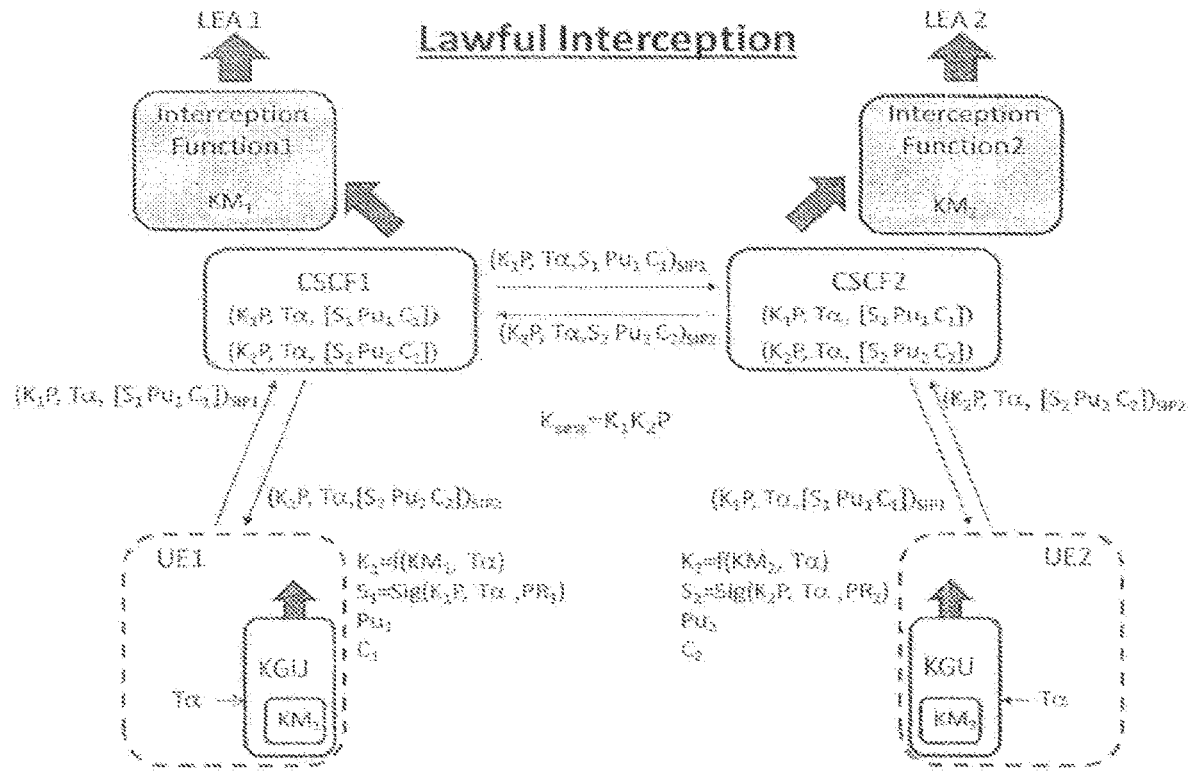
FIG. 4 illustrates a novel method for secure lawful interception according to one embodiment.

FIG. 4 provides an illustration of a method of key component protection according to one embodiment.

As shown in FIG. 4, after signing $T\alpha$ and $K_jP$ using the function $S_j=Sig(K_jP, T\alpha, PR_j)\square$, each KGU passes not only the key component $K_jP$ and the timestamp $T\alpha$ to the software, but also the signature $S_j$, the public key $Pu_j$, and the certificate $C_j$ for transmission on SIP. Note that since the KGUs are often implemented in hardware, the KGUs are expected to be significantly more robust to tampering by a malicious user. Further, by passing $S_j$, $Pu_j$, and $C_j$ to SIP for signaling, both the receiving UE and the network can be assured of the timestamp $T\alpha$ used in generating $K_{sess}$.

While it is necessary that the key components and timestamps transmitted by $UE_1$ and $UE_2$ are verified during the key generation process, it is preferable that the verification entity be the KGU or some other entity of the UE. Additionally the network CSCF devices can also perform this verification. However, it is likely that operators would prefer not to verify every key exchange, and instead would push such checking to the UE rather than perform this task within the network, other than for lawful interception warrants, in order to lighten the network load. When verification of the timestamp fails, the connection attempt can be terminated by the verification entity in which the failure occurs. If a UE refuses a connection due to failed verification, an alert can be signaled to the network, e.g., as a first step in blacklisting the transgressing UE.

Figure 5:
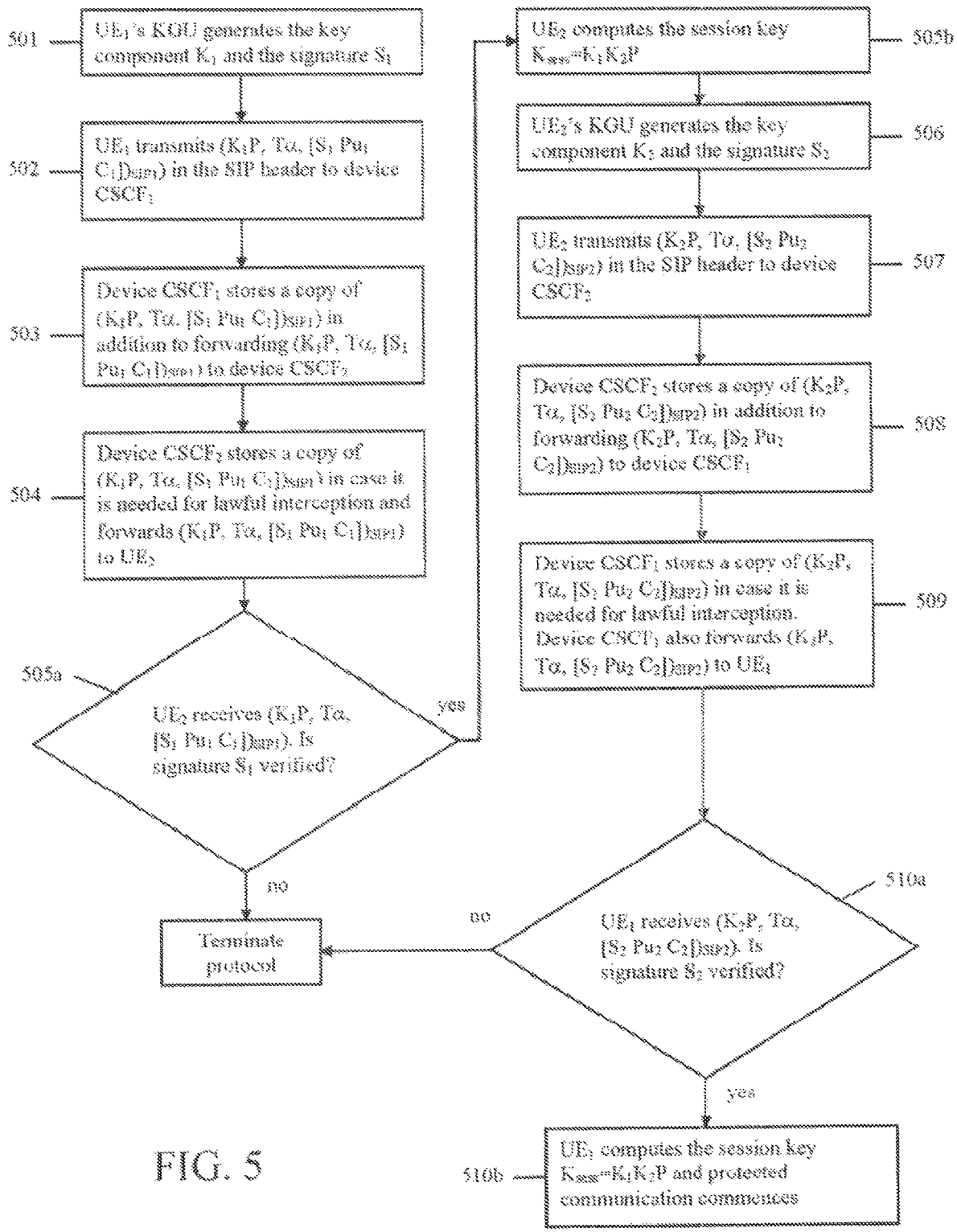
FIG. 5 is a flowchart of the steps in a novel method of secure lawful interception according to one embodiment.

FIG. 5 illustrates the steps in the key component protection method according to one embodiment.

In step 501, $UE_1$'s KGU generates the key component $K_1$ and the signature $S_1$.

In step 502, $UE_1$ transmits $(K_1P, T\alpha, [S_1 Pu_1 C_1])_{SIP1}$) in the SIP header to device $CSCF_1$.

In step 503, device $CSCF_1$ stores a copy of $(K_1P, T\alpha, [S_1 Pu_1 C_1])_{SIP1}$) in addition to forwarding $(K_1P, T\alpha, [S_1 Pu_1 C_1])_{SIP1}$) to device $CSCF_2$.

In step 504, device $CSCF_2$ stores a copy of $(K_1P, T\alpha, [S_1 Pu_1 C_1])_{SIP1}$) in case it is needed for lawful interception. Device $CSCF_2$ also forwards $(K_1P, T\alpha, [S_1 Pu_1 C_1])_{SIP1}$) to $UE_2$.

In step 505a, $UE_2$ receives $(K_1P, T_\alpha, [S_1 Pu_1 C_1])_{SIP1}$) and checks the signature $S_1$. If the signature is verified, $UE_2$ computes the session key $K_{sess}=K_1K_2P$ in step 505b. then proceeds to step 506. Otherwise, the connection is refused and the key agreement protocol terminated.

In step 506, $UE_2$'s KGU generates the key component $K_2$ and the signature $S_2$.

In step 507, $UE_2$ transmits $(K_2P, T\alpha, [S_2 Pu_2 C_2])_{SIP2}$) in the SIP header to device $CSCF_2$.

In step 508, device $CSCF_2$ stores a copy of $(K_2P, T\alpha, [S_2 Pu_2 C_2])_{SIP2}$) in addition to forwarding $(K_2P, T\alpha, [S_2 Pu_2 C_2])_{SIP2}$) to device $CSCF_1$.

In step 509, device $CSCF_1$ stores a copy of $(K_2P, T\alpha, [S_2 Pu_2 C_2])_{SIP2}$) in case it is needed for lawful interception. Device $CSCF_1$ also forwards $(K_2P, T\alpha, [S_2 Pu_2 C_2])_{SIP2}$) to $UE_1$.

In step 510a, $UE_1$ receives $(K_2P, T\alpha, [S_2 Pu_2 C_2])_{SIP2}$) and checks the signature $S_2$. If the signature is verified, $UE_1$ computes the session key $K_{sess}=K_1K_2P$ in step 510b and protected communication commences. Otherwise, the connection is refused and the key agreement protocol terminated.

Note that this embodiment includes the signing of parameters used in key generation, and thus need not be limited to the example case of the MIKEY-IBAKE key agreement protocol discussed above. This embodiment can be extended to other key agreement protocols currently under consideration for IMS Media Security, such as MIKEY-TICKET and Session Description protocol security description (SDES).

Similarly, the signed parameter need not be a timestamp and need not be the same in both UEs. For example, each UE could use its own specific nonce value in generating the keying information $K_j$, which it signs and which is signaled in some fashion to the target UE through the network. A signature on the nonce value will enable it to be verified, similarly to the timestamp discussed above. The nonce can be, e.g., a timestamp, a random number, or a sequence number.

Figure 6:
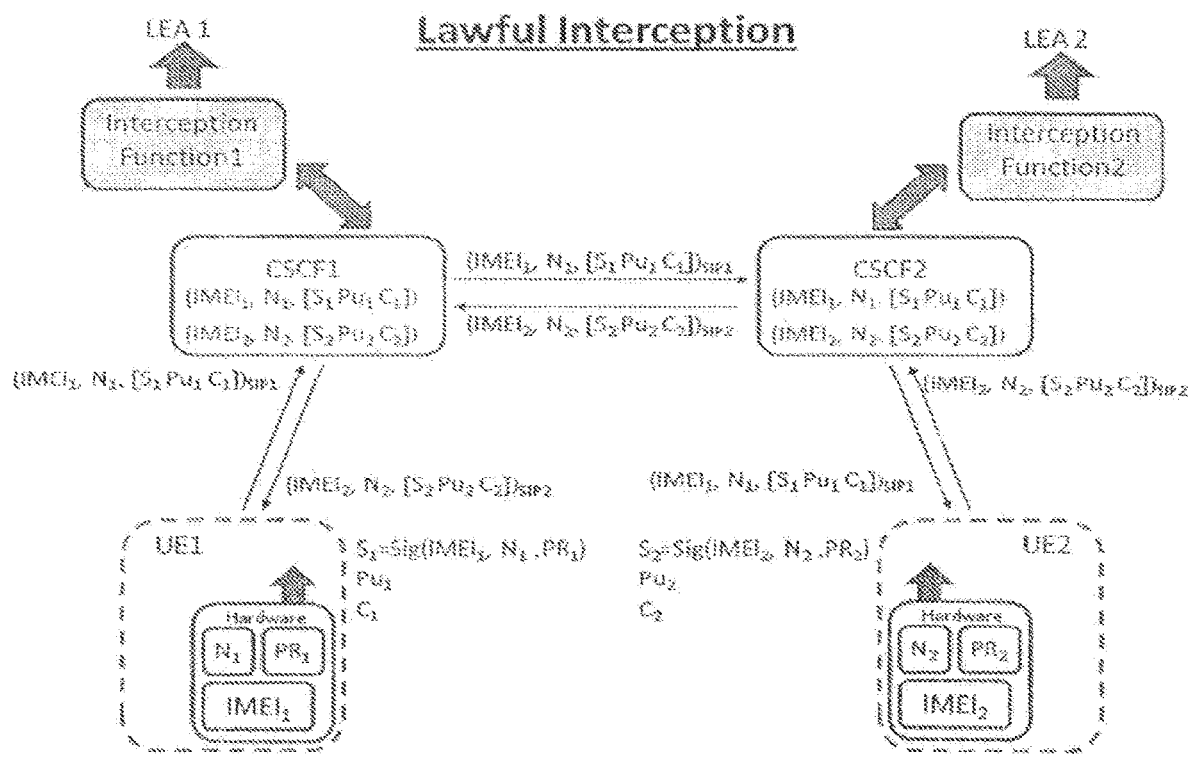
FIG. 6 illustrates a novel method of secure lawful interception using IMEI according to one embodiment.

In another embodiment, to protect the integrity of the IMEI, a hardware portion of the UE signs a nonce and the IMEI. The nonce $N_i$ can be, e.g., randomly generated or be the timestamp $T\alpha$ signaled in SIP. As shown in FIG. 6, instead of signaling the IMEI alone, a protocol contains the elements $IMEI_i$, $N_i$, and $[S_i Pu_i C_i]$, where the additional information $N_i$ and $[S_i Pu_i C_i]$ is carried in an extension field.

Similar to the case in key generation, the integrity protection of $IMEI_1$ can be verified by any one of several entities, such as $LEA_1$, $LEA_2$, $UE_2$ or any network (including either CSCF device). As discussed above, it is preferable that such checking be done by UEs, and connections refused in the case of verification failure.

If a UE refuses a connection due to a failed verification, an alert can be signaled to the network, e.g. as a first step in blacklisting a likely counterfeit UE. Since the verification information ($IMEI_i$, $N_i$, $[S_i, Pu_i C_i]$) is stored in the CSCF device, the network also has the means to re-validate any such alert as a further step in determining a counterfeit UE.

Figure 7:
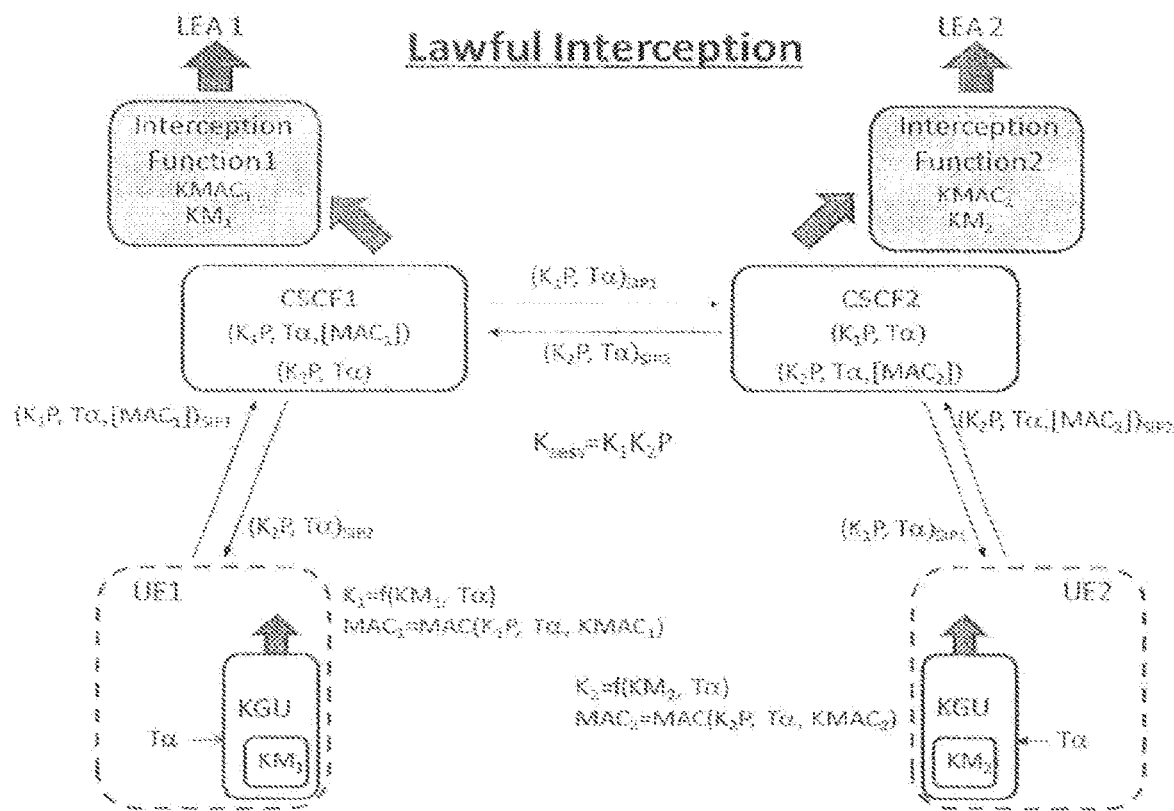
FIG. 7 illustrates a novel method of secure lawful interception using MAC tags according to one embodiment.

In another embodiment, instead of using a signature mechanism, each KGU computes a Message Authentication Code (MAC) tag from a MAC key. As shown in FIG. 7, the signature, the public key, and the certificate used in the embodiment of FIG. 4 are replaced by the computed MAC tag.

Note that since the use of a MAC tag amounts essentially to a symmetric key signature scheme, the interception device associated with a given UE network and the corresponding KGU of the UE must first agree on a MAC key ($KMAC_i$) with which to compute the MAC tag, as shown in FIG. 7. Note that this embodiment has an advantage in complexity over the embodiment shown in FIG. 4 since generation of a MAC tag is cheaper than that of a digital signature.

However, one disadvantage of this embodiment is that only the interception function in the UE's current network stores the MAC key $KMAC_i$, which is needed to verify the MAC tag of $UE_i$. Thus, storage of the MAC tag may only be needed in the CSCF device directly serving the UE. Further, $UE_2$ can no longer verify the timestamp of $UE_1$ (or visa versa). Stated differently, interception device of $LEA_1$ is the only entity outside of $UE_1$ that can verify $MAC_1$ as the MAC tag computed for $[K_1P,T\alpha]$.

The embodiment of FIG. 4 achieves the goal of lawful interception by binding the Elliptic curve Diffie-Hellman (ECDH) key component $K_iP$ to the timestamp used in deriving $K_i$. In other alternative methods, this binding can be achieved in different ways.

For example, in a first alternative method, the session key can be derived using a key derivation function (KDF) that takes as input the ECDH-generated key as well as the two timestamps (nonces).

In a second alternative method, both time stamps are multiplied as scalars by the ECDH-generated key. For example, $UE_2$ calculates $K_{sess}=T\alpha_1 T\alpha_2 K_2 K_1 P$ after checking that $T\alpha_1 T\alpha_2 K_2 \mod n \neq 1$, where n is the group order, i.e., the order of P.

A third alternative method is a slightly modified version of Elliptic Curve Menezes-Qu-Vanstone (ECMQV) that incorporates both time stamps, which are here called $T\alpha_1$ and $T\alpha_2$, in the session key calculation. The timestamps are also treated as nonces. This approach is more bandwidth efficient since a signature is not signaled on SIP, and is more calculation efficient compared to the timestamp signature verification method.

In this third alternative method, $UE_2$ has a long term key $(d_2, Pu_2)$, where $Pu_2$ is in $UE_2$'s certificate $C_2$. Here $d_2$ can be derived from $KM_2$ through a KDF, since $LEA_2$ is able to calculate it.

Alternatively, $d_2$ can be another ephemeral derived through KDF along with $k_2$.

Figure 1:
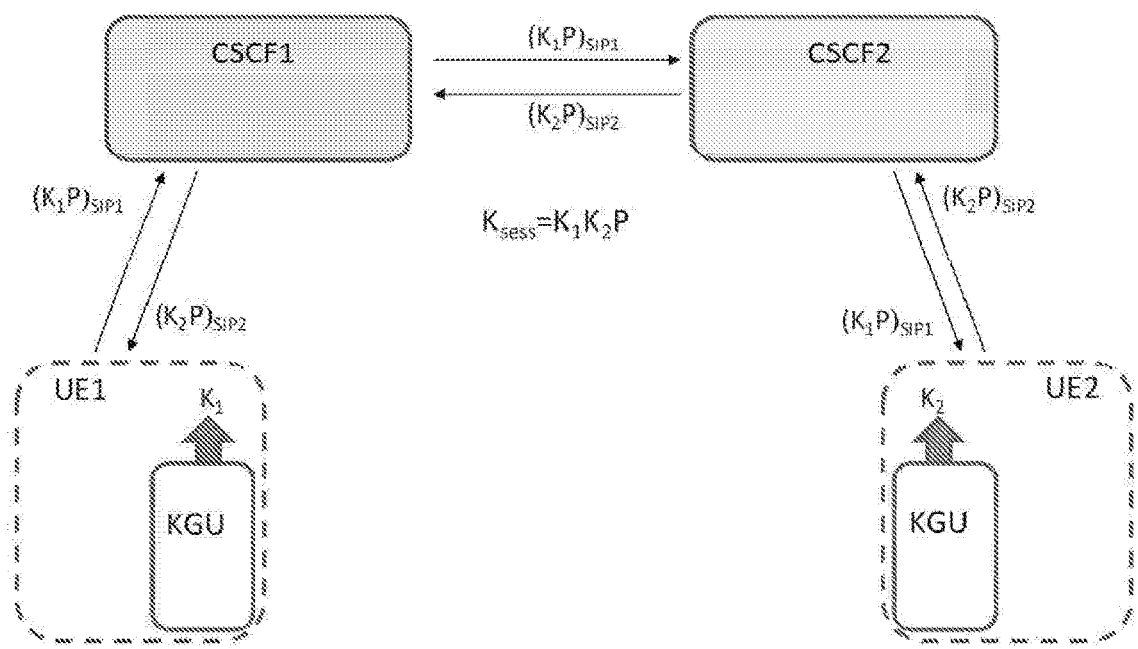
FIG. 1 illustrates the MIKEY-IBAKE process.
Figure 2:
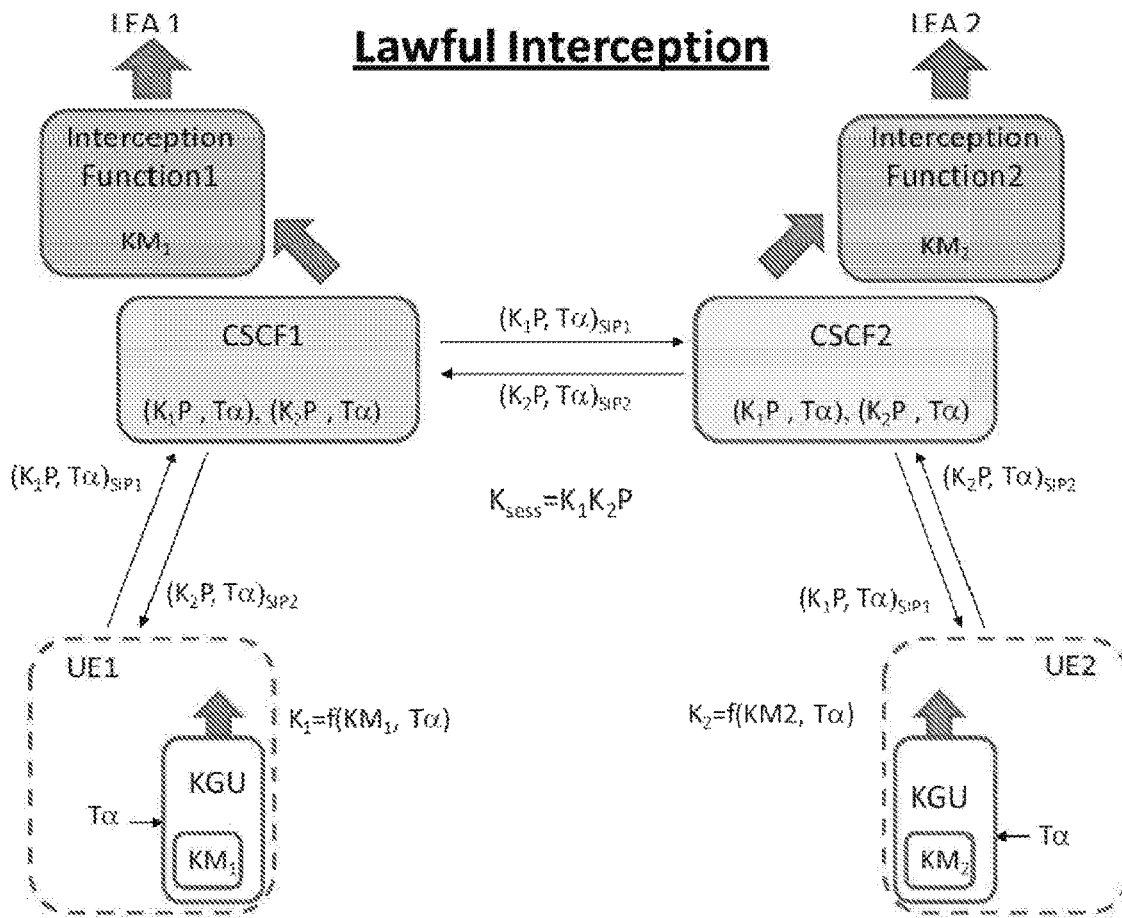
FIG. 2 illustrates a conventional lawful interception process.

Then, the sequence of calculations in the KGU of $UE_2$ is:

$$k_2 = f(KM_2, T\alpha_2); \text{ (same as } K_2 \text{ as calculated in FIG. 2)} \quad (1)$$

$$G_2 = k_2 P; \text{ (as before, here ECMQV starts)} \quad (2)$$

$$s_2 = k_2 + T\alpha_2 \times (G_2) d_2 (\text{mod } n); \text{ (ECMQV with the addition of } T\alpha_2) \quad (3)$$

$$UE_2 \text{ sends } [G_2, T\alpha_2, C_2] \text{ to } UE_1 \text{ and } UE_2 \text{ receives } [G_1, T\alpha_1, C_1] \text{ from } UE_1 \quad (4);$$

$$K_{sess} = hs_2 (G_1 + [T\alpha_1 \times (G_1)] Pu_1); \text{ (ECMQV with the addition of } T\alpha_1) \quad (5)$$

Note that while calculating $s_2$, $UE_2$ checks that $T\alpha_2 \times (G_2)$ mod $n \neq 1$, otherwise the process goes back to step 1. Further, while calculating $K_{sess}$, $UE_2$ checks that $T\alpha_1 \times (G_1)$ mod $n \neq 1$, otherwise the process aborts.

If $UE_2$ attempts to signal on SIP a $T\alpha_2'$ that is different from $T\alpha_2$, the session key will not be established correctly. This assures $LEA_2$ that $T\alpha_2$ is the one used in the calculation inside $KGU_2$. An extra check can be performed by $LEA_2$: (1) $k_2' = f(KM_2, T\alpha_2)$, and (2) check that $G_2' = k_2'P$ is equal to $G_2$.

Also note the second and third alternative methods described above both require some modification to the key protocol itself, and thus might entail greater changes to prior agreements within 3GPP.

The embodiments described above have several advantages in that they (1) can secure integrity protection of keying information and UE-identifier information using a MAC tag or signature; (2) can be used to refuse connection and/or reporting of malicious UEs by other UEs; (3) can be used by the network as a means of blacklisting counterfeit or compromised UEs; and (4) if the target UE or KGU are verification entities, the embodiments place no significant load on the network, thus reducing network implementation concerns.

Devices $CSCF_1$ and $CSCF_2$, as well as the intercepting devices of $LEA_1$ and $LEA_2$, can be implemented by one or more computers and/or one or more specialized circuits. A hardware description of such a computer is described with reference to FIG. 8. Further, each UE includes at least one or more processors (e.g., CPUs), a memory, a display, and a communication interface. The processor is configured to execute software to perform the functionality of the UEs described above. The KGUs described above can be implemented as a specialized hardware circuit or as software executed on the one or more processors.

Figure 8:
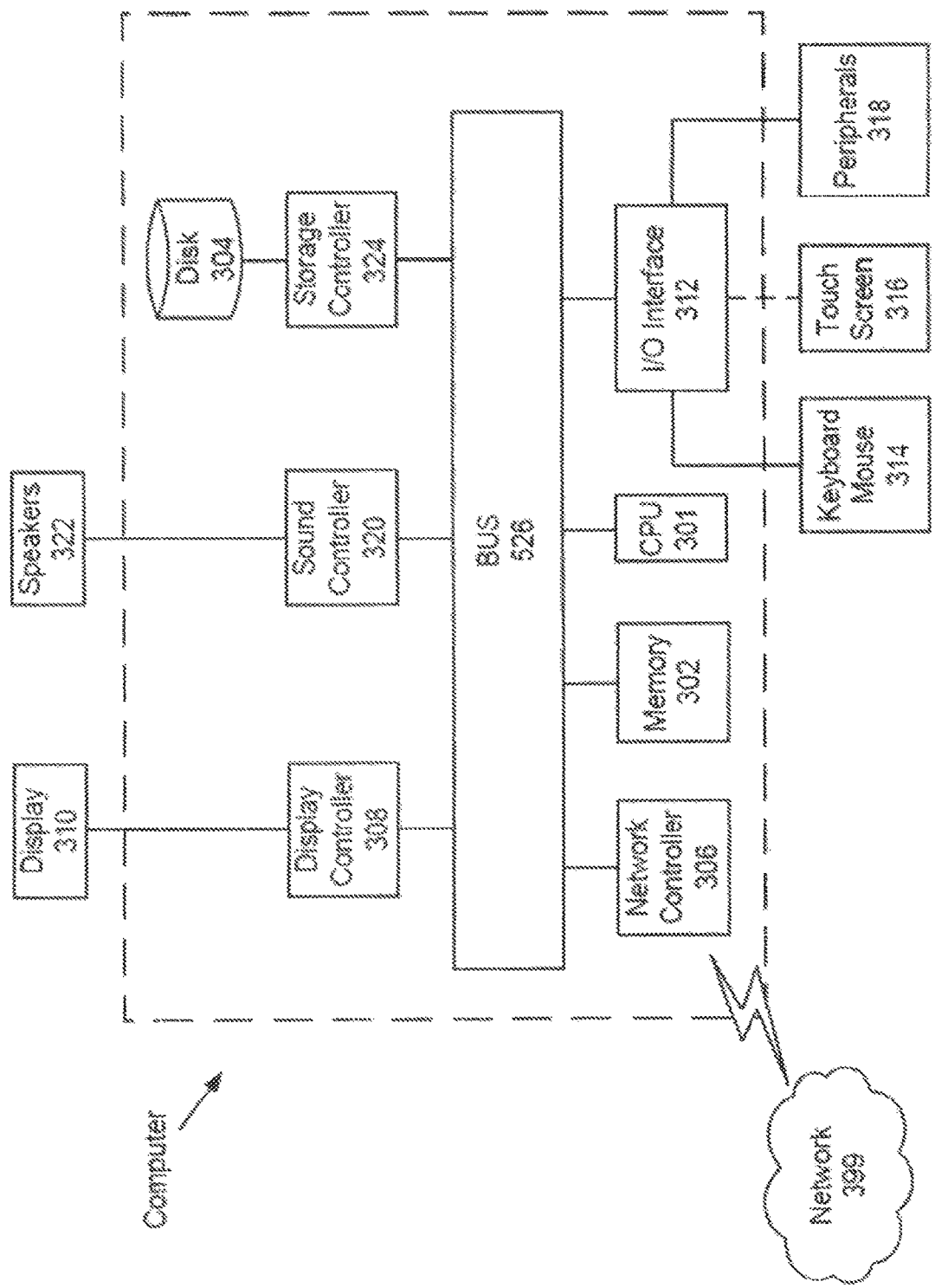
FIG. 8 illustrates hardware that can be used in the disclosed embodiments.

As shown in FIG. 8, the process data and instructions may be stored in memory 302. These processes and instructions may also be stored on a storage medium disk 304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer communicates, such as a server.

Further, the claimed embodiments may be provided as a utility application, background daemon, or component of an operating system, or combination thereof, executing in conjunction with CPU 300 and an operating system such as Microsoft Windows 7, UNIX, Solaris, LINUX, Apple MAC-OS and other systems known to those skilled in the art.

CPU 301 may be a Xenon or Core processor from Intel of America or an Opteron processor from AMD of America, or may be other processor types that would be recognized by one of ordinary skill in the art. Alternatively, the CPU 301 may be implemented on an FPGA, ASIC, PLD or using discrete logic circuits, as one of ordinary skill in the art would recognize. Further, CPU 301 may be implemented as multiple processors cooperatively working in parallel to perform the instructions of the inventive processes described above.

The computer in FIG. 8 also includes a network controller 306, such as an Intel Ethernet PRO network interface card from Intel Corporation of America, for interfacing with network 399. As can be appreciated, the network 399 can be a public network, such as the Internet, or a private network such as an LAN or WAN network, or any combination thereof and can also include PSTN or ISDN sub-networks. The network 399 can also be wired, such as an Ethernet network, or can be wireless such as a cellular network including EDGE, 3G and 4G wireless cellular systems. The wireless network can also be WiFi, Bluetooth, or any other wireless form of communication that is known. The network controller 306 may be used to establish a communication channel between the two parties, possibly through the network 399.

The computer further includes a display controller 308, such as a NVIDIA GeForce GTX or Quadro graphics adaptor from NVIDIA Corporation of America for interfacing with display 310, such as a Hewlett Packarda HPL2445w LCD monitor. A general purpose I/O interface 312 interfaces with a keyboard and/or mouse 514 as well as a touch screen panel 316 on or separate from display 310. General purpose I/O interface also connects to a variety of peripherals 318 including printers and scanners, such as an OfficeJet or DeskJet from Hewlett Packard.

A sound controller 320 is also provided in the computer, such as Sound Blaster X-Fi Titanium from Creative, to interface with speakers/microphone 322 thereby providing sounds and/or music. The speakers/microphone 322 can also be used to accept dictated words as commands for controlling the computer or for providing location and/or property information with respect to the target property.

The general purpose storage controller 324 connects the storage medium disk 304 with communication bus 326, which may be an ISA, EISA, VESA, PCI, or similar, for interconnecting all of the components of the computer. A description of the general features and functionality of the display 310, keyboard and/or mouse 314, as well as the display controller 308, storage controller 324, network controller 306, sound controller 320, and general purpose I/O interface 312 is omitted herein for brevity as these features are known.

In the above description, any processes, descriptions or blocks in flowcharts should be understood to represent modules, segments, or portions of code that include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

What is claimed is:

1. A non-transitory computer readable storage medium comprising instructions which, when executed by a processor of an apparatus for secure communication, cause the apparatus to:

generate a Message Authentication Code (MAC) tag using a MAC key, a nonce, and at least one of an identifier or a key component generated by the processor based on private key information associated with the apparatus and a publicly known elliptic curve point, wherein the identifier is one of an International Mobile Station Equipment Identity (IMEI), a Globally Routable User Agent (UA) URI (GRUU), an International Mobile Subscriber Identity (IMSI), or a Temporary International Mobile Subscriber Identity (TIMSI); and establish, a secure communication session with at least one other electronic device based on generating the MAC tag and at least session security data associated with the at least one other electronic device.

2. The non-transitory computer readable storage medium of claim 1, wherein the nonce is one of a timestamp, a random number, or a sequence number.

3. The non-transitory computer readable storage medium of claim 1, wherein the instructions further cause the apparatus to generate the key component using a master key, the nonce, and a known elliptic curve point.

4. The non-transitory computer readable storage medium of claim 1, wherein the instructions further cause the apparatus to transmit at least the MAC tag, the nonce, and the at least one of the identifier or the key component.

5. The non-transitory computer readable storage medium of claim 4, wherein the MAC tag is received and stored by a remote information processing system.

6. The non-transitory computer readable storage medium of claim 1, wherein the instructions further cause the apparatus to receive the session security data, wherein the session security data comprises a second nonce, and at least one of a second identifier or a second key component.

7. A non-transitory computer readable storage medium comprising instructions which, when executed by a processor of an apparatus for secure communication, cause the apparatus to:

establish a secure communication session with at least one electronic device based on session security data associated with the at least one electronic device having been verified by at least one remote information processing system that is separate and distinct from the apparatus and the at least one electronic device, the session security data comprising a nonce, at least one of an identifier or a key component, and a Message Authentication Code (MAC) tag that was generated using the nonce, the at least one of the identifier or the key component, and a MAC key associated with the at least one electronic device, wherein the key component was generated by the at least one electronic device based on private key information associated with the one electronic device and a publicly known elliptic curve point, wherein the identifier is one of an International Mobile Station Equipment Identity (IMEI), a Globally Routable User Agent (UA) URI (GRUU), an International Mobile Subscriber Identity (IMSI), or a Temporary International Mobile Subscriber Identity (TIMSI).

8. The non-transitory computer readable storage medium of claim 7, wherein the instructions further cause the apparatus to establish the secure communication session based on receiving, from the at least one remote information processing system, at least the key component and the nonce associated with the at least one remote information processing system.

9. The non-transitory computer readable storage medium of claim 7, wherein the nonce is one of a timestamp, a random number, or a sequence number.

10. An apparatus for secure communication, the apparatus comprising:

a memory comprising instructions; and a processor coupled to the memory and configured to execute the instructions to cause the apparatus to:

generate a Message Authentication Code (MAC) tag based on a MAC key, a nonce, and at least one of an identifier or a key component, wherein the identifier or the key component is generated based on private key information associated with the apparatus and a publicly known elliptic curve point; and establish, a secure communication session with at least one electronic device based on the MAC tag and session security data associated with the at least one electronic device.

11. The apparatus of claim 10, wherein the identifier is a Globally Routable User Agent (UA) URI (GRUU).

12. The apparatus of claim 10, wherein the identifier is one of an International Mobile Station Equipment Identity (IMEI), an International Mobile Subscriber Identity (IMSI), or a Temporary International Mobile Subscriber Identity (TIMSI).

13. The apparatus of claim 10, wherein the nonce is one of a timestamp, a random number, or a sequence number.

14. The apparatus of claim 10, wherein the instructions further cause the apparatus to generate the key component based on a master key, the nonce, and a known elliptic curve point.

15. The apparatus of claim 10, wherein the instructions further cause the apparatus to transmit the MAC tag, the nonce, and the at least one of the identifier or the key component to a remote information processing system.

16. The apparatus of claim 10, wherein the instructions further cause the apparatus to receive the session security data, and wherein the session security data comprises a second nonce and at least one of a second identifier or a second key component.

17. The apparatus of claim 10, wherein the apparatus or the at least one electronic device comprises a user equipment (UE).

18. The apparatus of claim 10, wherein the nonce comprises a value specific to the apparatus.

19. The apparatus of claim 18, wherein the instructions further cause the apparatus to generate keying information using the value specific to the apparatus.

20. The apparatus of claim 19, wherein the instructions further cause the apparatus to signal the keying information to a target electronic device.

* * * * *